United States Patent [19]

Grisham

[11] Patent Number: 4,602,257

[45] Date of Patent: Jul. 22, 1986

[54] METHOD OF SATELLITE OPERATION USING SYNTHETIC APERTURE RADAR ADDITION HOLOGRAPHY FOR IMAGING

[76] Inventor: William H. Grisham, 430 Russell Ave., Long Beach, Miss. 39560

[21] Appl. No.: 620,911

[22] Filed: Jun. 15, 1984

[51] Int. Cl.$^4$ .............................................. G01S 13/89
[52] U.S. Cl. .................................... 343/5 CM; 343/17
[58] Field of Search ............ 343/5 CM, 17, 352, 356, 343/357

[56] References Cited

U.S. PATENT DOCUMENTS 3,243,706  3/1966  Grisham .......................... 343/352 X
4,325,065  4/1982  Caputi ............................. 343/5 CM

OTHER PUBLICATIONS

Tomiyasu, Bistatic Synthetic Aperture Radar Using Two Satellites, Sep. 1978, IEEE, pp. 106–110.

"Range-Doppler Imaging of Rotating Objects" by Jack L. Walker.

Primary Examiner—Thomas H. Tarcza
Assistant Examiner—Mark Hellner
Attorney, Agent, or Firm—Pravel, Gambrell, Hewitt & Kimball

[57] ABSTRACT

A method of satellite operation utilizing a paired-satellite configuration in which one satellite illuminates the imaged field of view and the other satellite receives the reflected energy using bistatic synthetic radar. This method enables the unambiguous detection of radar signals for imagery construction, improves stability for image quality, provides recording format linearity to minimize image reconstruction processing, provides orthogonal range-doppler pattern distribution at all points in the recording plane to minimize computer processing, provides a triangulated signal reference baseline to improve system calibratability, and enables conformal mapping and uniform sampling of zone plates to achieve three dimensional holography.

13 Claims, 13 Drawing Figures

BASELINE CONFIGURATION FOR ZONE PLATE SAMPLING.

A SURFACE OF
CONSTANT RANGE
(ISORANGE)

A SURFACE OF
CONSTANT DOPPLER
(ISODOPPLER)

PROJECTION OF ISORANGE & ISODOPPLER LINES
SHOWING ALL INTERSECTIONS ARE ORTHOGONAL

METHOD OF SATELLITE OPERATION USING SYNTHETIC APERTURE RADAR ADDITION HOLOGRAPHY FOR IMAGING

BACKGROUND OF THE INVENTION

1. Field of the Invention

The present invention relates to mechanical methods for operating satellites utilizing synthetic aperture radar and holography for imaging. The method of the present invention therefore primarily involves the application of principles in the fields of orbital mechanics, classical mechanics, and analytical geometry to achieve improvements in synthetic aperture radar methods. The method of satellite operation disclosed and claimed herein is particularly useful for detecting minerals in the ground, forest cover, agricultural growth starter, soil moisture states or other conditions in the illuminated area.

2. Description of the Prior Art

In the past, satellites have been used for various communication purposes. For example, in my prior U.S. Pat. No. 3,243,706, issued Mar. 29, 1966, there was disclosed a satellite net configured for uninterrupted global coverage and dynamically balanced tracking. That patent disclosed the use of three satellite sub-systems with four satellites employed in each sub-system, all being mutually perpendicular with two of the sub-systems in polar planes 90° apart. The remaining subsystem was in an equatorial plane. The arc distance from plane crossings was nominally equal for all satellites. That system was directed primarily to communication satellite linking. It was also useful for certain types of imaging, but suffered from an inability to provide fine ground resolution. In order to facilitate communication functions, the method of U.S. Pat. No. 3,243,706 required that the satellites utilized be in high altitude orbits which necessarily resulted in poor ground resolution for optical imaging.

Another bistatic synthetic aperture radar method was disclosed in U.S. Pat. No. 4,325,065. This patent disclosed a method of producing range-doppler imagery which was a linear construct over a field of view limited by the aircraft altitude. U.S. Pat. No. 4,325,065 taught a flat-earth mathematical model, which was apropos only to small viewing areas visible from aircraft altitudes wherein the aircraft traversed a distance of less than 30 miles, or a great circle distance of less than one-half degree. Thus, the application of this method was severely limited for satellite operations since satellites operate at much greater altitudes and velocities than aircraft. Thus, this flat-earth model was unacceptable for satellite operations wherein a spherical-earth mathematical model was preferred to focus the nominally spherical surface of the earth for large fields of view, to provide large synthetic apertures for fine resolution and high contrast.

Walker in his article titled "Range-Doppler Imaging of Rotating Objects", IEEE Transactions on Aerospace and Electronic Systems, Vol. AES-16, No. 1 January 1980 disclosed a range-doppler imaging radar which used a prediction model based upon a rotating spherical earth. Walker's method was perfectly linear, wherein a point target in the object field created a family of straight lines in the video recording on a rotating disc medium. In contrast to the method in U.S. Pat. No. 4,325,065, which required a known reference point in the field of view, and where the doppler history of the point was required to be known a priori, Walker's method only required a rotational history of the object as a whole as the a priori knowledge.

All of the prior art range-doppler imaging methods had various limitations and short comings which are overcome by the method of the present invention. For example, the method of U.S. Pat. No. 4,325,065 was useful for obtaining unregistered images for small fields of view, but not for mapping wherein cartographic registration to a geodetic datum is required. This method was also not feasible for broad ocean imaging wherein known reference points are usually not available. If this method were to be applied to satellites, the field of view would necessarily be restricted to an area of less than one thousand square miles in order to limit the errors imposed by the use of a flat-earth model. Therefore, a global mosaic of the small area images would require more than one-hundred thousand image plates. Since these plates would for the most part not have known geodetic reference points, as most of the earth's surface, i.e., the oceans, could not be imaged, then global geodetic control would not be practical. Furthermore, the imagery would not be made conformal since the known reference points would be distributed randomly whereas conformal plates must be distributed uniformly to enable equal projection at the overlap or match-line points between adjacent conformal plates.

Walker's method could only be adapted to provide an imaging system for bistatic synthetic aperture radar satellites if a method for providing conformal system mapping planes with system phase center intercepting the center of the rotating object field was devised. Such a system for conformal mapping of the synthetic aperture radar imagery is part of the method of the present invention, wherein the geometry and dynamics of the system are designed to accommodate linear range-doppler recording and reconstruction of bistatic synthetic aperture radar images on disc recording media, recorded as parallel to one of a conformal geodetic mapping set of eight planes encompassing the entire earth surface. The method of the present invention is therefore a significant improvement over these prior art methods.

All prior or synthetic aperture radar methods and range-doppler imaging radar suffered degraded images from an aberration known as range curvature. This aberration was caused by a failure in these methods to preserve signal surface orthogonality throughout the recording plane at all times. In the preferred method of the present invention, orthogonality of the signal surface is preserved at all points and at all times in the recording plane by the method whereby the bistatic synthetic aperture radar base-line is inertially fixed parallel to the recording plane. This elimination of range curvature is a significant improvement over all previous synthetic aperture radar range and range-doppler radar methods.

SUMMARY OF THE INVENTION

The method of the present invention utilizes a paired-satellite configuration in which one satellite illuminates the imaged field of view and the other satellite reconstructs the imagery using bistatic synthetic radar. This method enables the unambiguous detection of radar signals for imagery construction, improves stability for image quality, provides recording format linearity to minimize image reconstruction processing and enables conformal mapping and uniform sampling of zone plates to achieve three dimensional holography.

In the method of the present invention, only eight conformal planes are used for global mapping control. The spatial orientation of these planes is known relative to the earth's geodetic reference, i.e., latitude and longitude, are fixed with respect to the sidereal coordinates. Thus the planes are inertially fixed. Although these planes are much larger than those in prior art methods, the method of the present invention accommodates a spherical-earth mathematical model such as that disclosed by Walker in "Range-Doppler Imaging of Rotating Objects", IEEE Transactins on Aerospace and Electronic Systems, Vol. AES-16, No. 1 (January, 1980), the contents of which are incorporated by reference herein, which can replicate a spherical rotating surface with small projection angles and hence small geometric distortion. Since Walker's method maintains linear constructs through rotation angles of up to 120°, i.e., about 8,000 miles of arc, by providing a method which incorporates the geometric and dynamic requirements of Walker's mathematical model into a satellite operating system using bistatic synthetic aperture radar, the present invention overcomes the limitations of prior art methods.

The present invention uses nominally circular orbits, and nominally circular synthetic apertures, hence the optical near field of a maximum synthetic aperture includes the entire earth's surface visible to the satellite. In contrast to the prior art flat-earth models, e.g., U.S. Pat. No. 4,325,065, which inherently limited the potential synthetic aperture size, the method of the present invention permits all points in the near field, i.e., the entire earth's surface, to be focused and thereby does not limit ground resolution. Since the present invention accommodates a spherical model mapped to a recording format which is highly linear even over the huge arcs commensurate with the entire visible, i.e., focused, surface, the resolution of the present invention is not degraded by prediction errors, distortion, or limited field of view as are other synthetic aperture radar methods. This is a very significant improvement over prior art methods.

Prior art monostatic and bistatic synthetic aperture radar and range-doppler radar created a one dimensional hologram comprised of one dimensional zone plate diffraction patterns for each object in the field of view. In accordance with the present invention, two, three, four, five or six one-dimensional holograms are coherently added to provide a sampled two-dimensional hologram or zone plate. Accurate mapping of the two-dimensional zone plate by the one dimensional holograms is accomplished in the method of the present invention by symmetrically distributing these holograms in the same mapping plane. This compositely sampled 2-dimensional zone plate method of the present invention is thereby an improvement over previous synthetic aperture radar methods, which were limited to one-dimensional holograms. The symmetry in the distribution of the holograms in the present invention results in images which are geometrically dimensioned as a true scale view when viewed from any direction. The present invention provides this advantage by using a satellite pattern in which the velocity magnitude of each satellite projects equally in the recording plane.

While previous monostatic and bistatic synthetic aperture radar used one-dimensional holograms to create a two-dimensional image, the preferred method of the present invention creates a two-dimensional zone plate type hologram which is used to create three-dimensional holography when the zone plate hologram is subsequently coherently illuminated. The present invention thereby provides imagery which can be rotated for optimum viewing and scaling, while preserving parallax. Prior art monostatic and bistatic synthetic aperture radar were not capable of recording directly onto a plane which was part of a symmetric and conformal mapping set with identical distortion at the match line between adjacent mapping planes. The method of the present invention uses one of the available eight isometric planes as the mapping plane for each bistatic synthetic aperture radar pair. One, two, or three bistatic synthetic aperture radar may map to the same plane using the method of the present invention. In the case of three paired synthetic aperture radars, the intra-satellite lines of sight, known as the base lines of the three bistatic synthetic aperture radar, form an equilateral triangle. In this way, the method of the present invention uniformly samples the two-dimensional zone plate hologram with each of the uniformly distributed one dimensional holograms, and therefore accommodates triangulation techniques for improved registration accuracy and computational speed, i.e., triangular closure and other similar calibration methods. The method of the present invention is thereby both simple and optimally linear, and calibratable which greatly simplifies imagery construction. For this reason, the method of the present invention requires far less computer complexity and speed to reconstruct the holography imagery than would utilization of prior art methods.

Previous bistatic synthetic aperture radar were limited in useful dwell time because they were not able to determine the frequency off-set and drift of the reference oscillator. In the method of the present invention, phase coherence is maintained for all satellites linked for synthetic aperture radar imaging, wherein one satellite is a master satellite and the others are slave satellites. The master-to-slave synthetic aperture radar video and the slave-to-master or slave-to-slave synthetic aperture radar video are kept optimally coherent during collection and processing of the composite signals at the master satellite, or alternatively, at the ground. This geometric aspect of the method of the present invention enables a simple comparison of fringe off-set and spatial frequency differences as a means of determining the reference frequency off-set and drift rate errors. This aspect of the method of the present invention enables these errors to be determined and subsequently corrected thereby extending the useful coherence time and hence the useful synthetic aperture size and the image resolution. The method of the present invention provides for both addition and subtraction of the holographic data. When the composite signal is differenced and then the aggregate contrast is made minimal by shifting the holograms in position and adjusting the fringe interval, a minimum error is reached. Also, this method of actively minimizing the aggregate differenced contrast through fringe interval and position, i.e., phase adjustment, assures a scaled and rectified composite 2-dimensional zone plate. Also, this method is useful to detect moving objects and surface stress patterns in the earth's crust.

The method of the present invention uses a set of bistatic synthetic aperture radar base lines which rotate and cycle in length in a uniform way about the mapping plane center which is an isometric axis (at equal angles from the orbital axes). This aspect of the method of the present invention enables an efficient sampling of the 2-dimensional zone plate hologram with uniform distribution of the one-dimensional holograms. The spatial length cycling of the base line provides for the spatial frequency sampling of the object field, hence the method samples the 2-dimensional hologram in spatial geometry, spatial frequency, and contrast. This aspect of the present invention permits discrimination by target size, which is an improvement over all previous synthetic aperture radar methods.

The previous monostatic and bistatic synthetic aperture radar used both range and doppler history to create 2-dimensional imagery, but the need for range resolution commensurate with azimuth resolution derived from doppler history, resulted in very wide band radar operation which was very energy intensive. As a result, the value of synthetic aperture radar for satellite operation was diminished since all satellites are very limited in power. One embodiment of the present invention accommodates narrow band or doppler-enhanced methods of imaging as described by Walker which thereby permits 2-dimensional high resolution imaging with much lower energy requirements. Narrow band imaging is an optional mode in the method of the present invention which permits the method of the present invention to use less energy per resolved pixel for any given resolution-contrast image quality level than any prior synthetic aperture radar method.

DESCRIPTION OF THE PREFERRED EMBODIMENT

Figure 1:
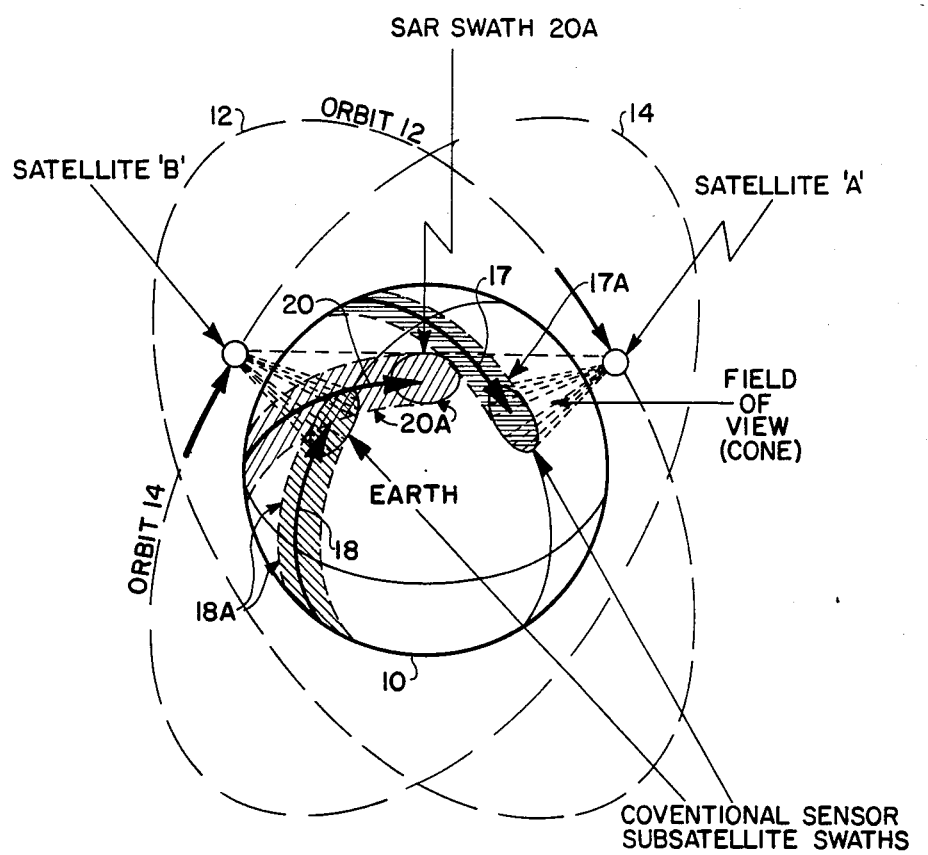
FIG. 1 is a schematic illustration of satellite orbits and imagery swaths as viewed from a plane parallel to the recording plane and imaging plane of the synthetic aperture radar; this viewing plane is isometric to the planes of the orbits.

Referring now to the drawings, the method of the present invention uses a pair of earth orbiting satellites A, B, wherein at least one satellite has a transmitter for transmitting radar waves to illuminate an area on the earth with a synthetic aperture beam, and at least one satellite is provided with a receiver for receiving radar information from the synthetic aperture radar beam after the beam has been reflected from the illuminated area (FIG. 1). In FIG. 1, satellites A, B orbit the earth 10 in nominally circular, and mutually orthogonally orbits 12, 14, respectively. In conventional satellite radar operations, satellites A, B would independently illuminate a swath such as swaths 17A, 18A, respectively. In contrast, in the synthetic aperture radar method of the present invention, satellites A, B are paired to illuminate and receive reflected radar information from swath 20 and the surrounding area 20A (FIG. 1). Swath 20 is a bistatic vertical view and represents the area to be illuminated by the synthetic aperture radar for imagery reconstruction, or other bioptical imaging, as taught in the present invention. The satellites A, B communicate via a line of sight communication link C (FIG. 2) and the illuminated area 20A lies generally on or near the perpendicular bisector 33 of link C. Communication link C also serves as the baseline for the bistatic synthetic aperture radar.

Figure 3:
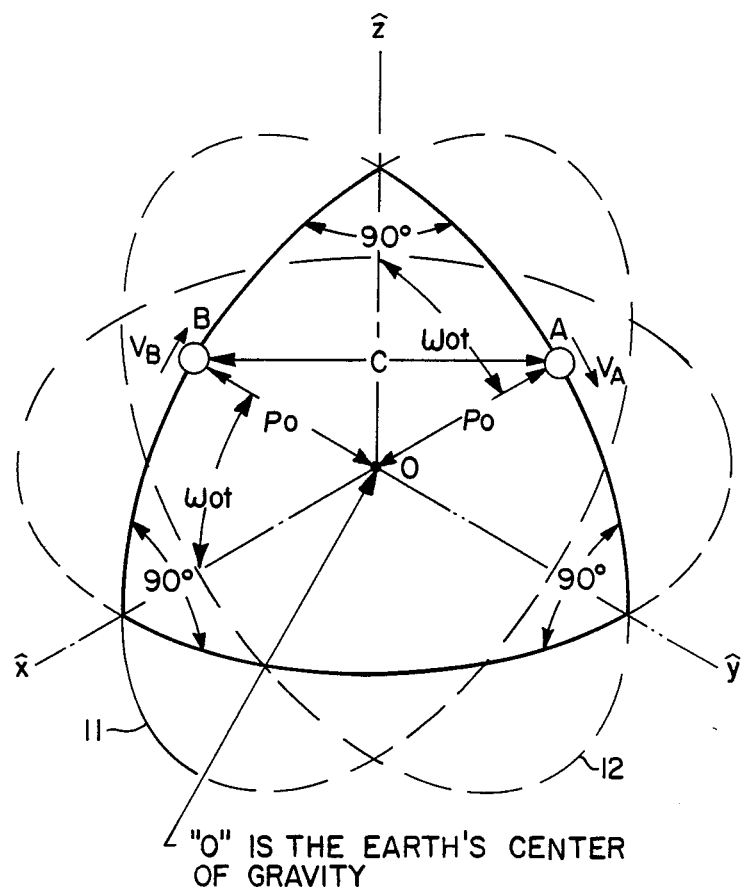
FIG. 3 is an isometric illustration of one method of satellite operation in accordance with the method of the present invention illustrating one of three bistatic pairings in a given recording plane.

The satellite orbit epochal phase, as is for example designated $\omega_0 t$ in FIG. 3, are preferably set to maintain equal great circle arc distance from the last orbital plane crossing to the satellite. The satellite orbits are also preferably equal and resonant, i.e., their angular velocity is a multiple of the earth's angular velocity.

The preferred satellite epoch and sidereal right ascension from the point of Aries, i.e., the inertial equivalent of longitude, is matched to the gravity field of the earth at the epochal phase of optimum stable equilibrium for the substantially resonant, and polar or equatorial orbits. Placing satellites A, B in a resonant orbit insures that all satellites, even in more fully populated cases, will be continuously in a state of stable equilibrium in the earth's gravity field. Satellites thus positioned have tendency to maintain their epochal phase in orbit, thus reducing the need for station-keeping operations.

At least one of satellites A, B illuminates an area on the earth 20A (FIG. 2) with synthetic aperture radar, and if desired, both satellites may illuminate the same area simultaneously with each or either of the satellites receiving the reflected the radar information. If desired, one satellite may illuminate the desired area with the radar beam while the second satellite receives the reflected radar information.

The length or range of the communication link "C" (FIG. 2) between satellites, varies cyclically during the orbiting of the satellites. The distance or range between at least one of the satellites and the illuminated area, as is designated in the drawings with the letter $R_o$, also varies cyclically during satellite operation. In the method of the present invention, communication link C provides a modulated carrier with side bands containing communicated information generated, transmitted and received by suitable conventional communication equipment. The manner of establishing a suitable communication link C is known in the art and is not a part of the present invention and is thus not described herein. The communicated information includes the range or length of communications link C between communicating satellites and the relative velocity, i.e., the rate of change in the length of communication link C designated $\dot{C}$ herein.

Figure 2:
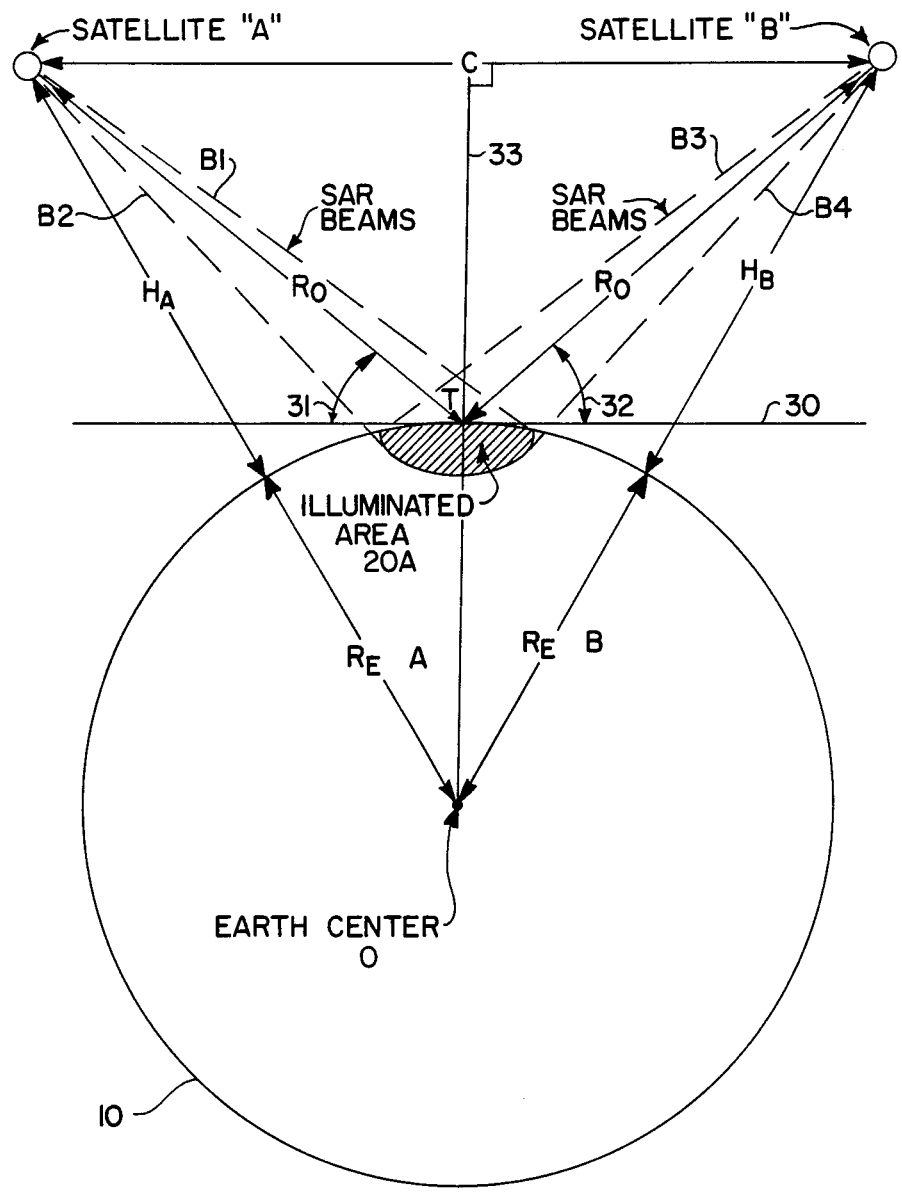
FIG. 2 is a schematic illustration of one method of satellite operation of the present invention viewed in the plane that includes the two satellites imaging bistatically with synthetic aperture radar and the earth's center.

Referring now to FIG. 2, a schematic illustration of a side view of orbiting satellites A and B is provided. The plane of view in FIG. 2 is that established by the earth's center O and satellites A, B. Various parameters are designated in FIG. 2 including T, the point of equal and minimum propagation time, i.e., nominally equal range, from satellites A, B to a hypothetically smooth surface spherical earth 10. Since satellites A, B are positioned in nominally circular orbits 12, 14, respectively, and have nominally the same angular velocity, the orbital radii of the satellites are nominally equal for a hypothetical spherical and homogeneous gravity field.

The present invention includes a means for measuring the length of link C or range between satellites A, B and range rate $\dot{C}$ between satellites A and B. That intersatellite distance is designated by the letter C in FIG. 2 and schematically parallels the communications link, the intrasatellite range and range rate link, and the bistatic synthetic aperture radar base-line. Also schematically shown is the range Ro, from satellite B to point T and again an equal range Ro from satellite A to point T. The altitude of each satellite A, B is designated as Ha for satellite A and Hb for satellite B. Altitudes Ha, Hb are measured continuously by conventional radar altimeters or the like.

A reference tangent line 30 which is tangent to the earth 10 at point T is shown forming angles of incidence and reflection 31, 32, respectively with range lines Ro. Angles 31, 32 are nominally equal and line 30 is nominally parallel with link C. This configuration minimizes energy loss in the transmitted and received radar signals. Transmitted radar beams are shown schematically in FIG. 2 as between phantom lines B1, B2, B3, and B4 surrounding each Ro range distance from satellite A, B to the illuminated area. The beam from satellite A is schematically illustrated as within the area defined by phantom lines B1, B2 while the beam from satellite B is schematically illustrated as between the phantom lines B3, B4 of FIG. 2. At least one of the satellites A, B includes a receiver to receive radar information from the synthetic aperture radar beams B1-B2 and/or B3-B4 after such information has been impressed on the incident radar wave upon interaction with and reflection from the area of illumination 20A. In FIG. 2, an example of midpoint illumination and imaging is illustrated but it should be understood that other areas 20A may also be selected if desired.

Satellite A, B communicate via radio frequency transmission link C with a base-line frequency which is phase coherent with the radar frequency. Any suitable method of providing a communications link with such phase coherency as are known in the art may be used. This phase coherent synchronization is useful for the maintenance of a radar clock reference which is common to both satellites. For accurate maintenance of phase coherence, the frequency of the communication link is preferably many times the frequency of the radar and the frequency of the radar is obtained by division from the communication reference. This coherence enables the accurate trigonometric determination of the radial component of the range rate of $R_o$, denoted as $\dot{R}_o$. This was mathematically derived in the SARAH Disclosure, dated April 1980. This separation of radial doppler $\dot{R}_o$, leaves only the tangential doppler, which is the principle component of doppler needed for the reconstruction of range-doppler imagery. In said disclosure it was shown that:

$$\dot{R}_o = \dot{C}\left[\left(\frac{C^2}{2R_o^2} - \frac{C^4}{16R_o^2\rho_o^2}\right)^{\frac{1}{2}} - \left(\frac{C^2}{4o^2} - \frac{C^4}{16R_o^2\rho_o^2}\right)^{\frac{1}{2}}\right]$$

where C is the range (length) of the baseline, as determined by conventional electronic ranging methods, $\dot{C}$ is the range rate, or doppler, as also determined by conventional electronic means, and $\rho_o$ is the radial distance from satellites A, B to the center of the earth.

Since the parametric sensitivity to error, i.e., the statistical noise, of an equation is always dominated by the numerator, then the precision of $\dot{R}_o$ is dominated by the precision of the determination of C and $\dot{C}$. Since link C does not traverse the atmosphere, and the method of the invention uses a frequency for link C, for example, at 10 to 100 times higher than $R_o$ (the SAR frequency) then phase quantization error is commensurately finer. In this way, the present invention improves the separation of radial doppler from tangential or azimuthal doppler over all previous SAR. Also, this method of the present invention does not require altimeter data, although said altimeters have been specified herein for redundancy, and acquisition reasons.

In the method of the present invention, the point T nominally lies along the center line of illuminated area 20A, being centered on the perpendicular bisector 33 of link C. Bisector 33 is also the phase center line of the bistatic synthetic aperture radar and nominally intersects the earth's center.

Receipt of the reflected radar information by one of satellites A, B using conventional bistatic synthetic aperture radar devices, as disclosed in U.S. Pat. No. 4,325,065, the contents of which are incorporated by reference herein, completes the method of satellite operation of the present invention for imaging purposes. The method of the present invention further includes a method of linearizing the transformation of the unprocessed video signals into reconstructed imagery as is described hereinafter.

The planes of satellite orbits 12, 14 are preferably at substantially right angles with respect to one another and the orbital epochal phase is distributed so as to create a constant angular momentum dynamic motion for the synthetic aperture radar beam center lines $R_o$, the inter-satellite links C, and the bistatic radar phase center line 33. In the method of the present invention, these parameters vary cyclically under constant angular momentum motion which is thereby both stable and highly deterministic. The satellites A, B are distributed in position and velocity symmetrically about the center of the isometric plane, i.e., the plane isometric to the orbital planes which is the plane of the paper in FIG. 3, and in accordance with principals of classical mechanics the method provides constant angular momentum of all parts distributed symmetrically about the axis of symmetry. To effect symmetry, the orbital epochs are provided at equal angles in time from the orbital intersections, i.e., arc distance X-to-B nominally equals arc distance Z-to-A, velocity Vb nominally equals velocity Va, angular velocity $\omega_o$ is nominally the same for both orbits, and radial distance $\rho_o$ is nominally equal for both orbits (FIG. 3).

Thus, the method of the present invention provides for the symettrical distribution of constant angular momentum of satellites A, B, which enhances stability and permits the use of inertially fixed references and recording planes, simple antenna drives, and a method of orthogonal and linear imaging as will be described in more detail below. The preferred method of the present invention orients the recording plane to a side looking aspect in order to render a non-ambiguous format of range and doppler lines in the one-dimensional hologram record of the synthetic aperture radar.

Figure 4:
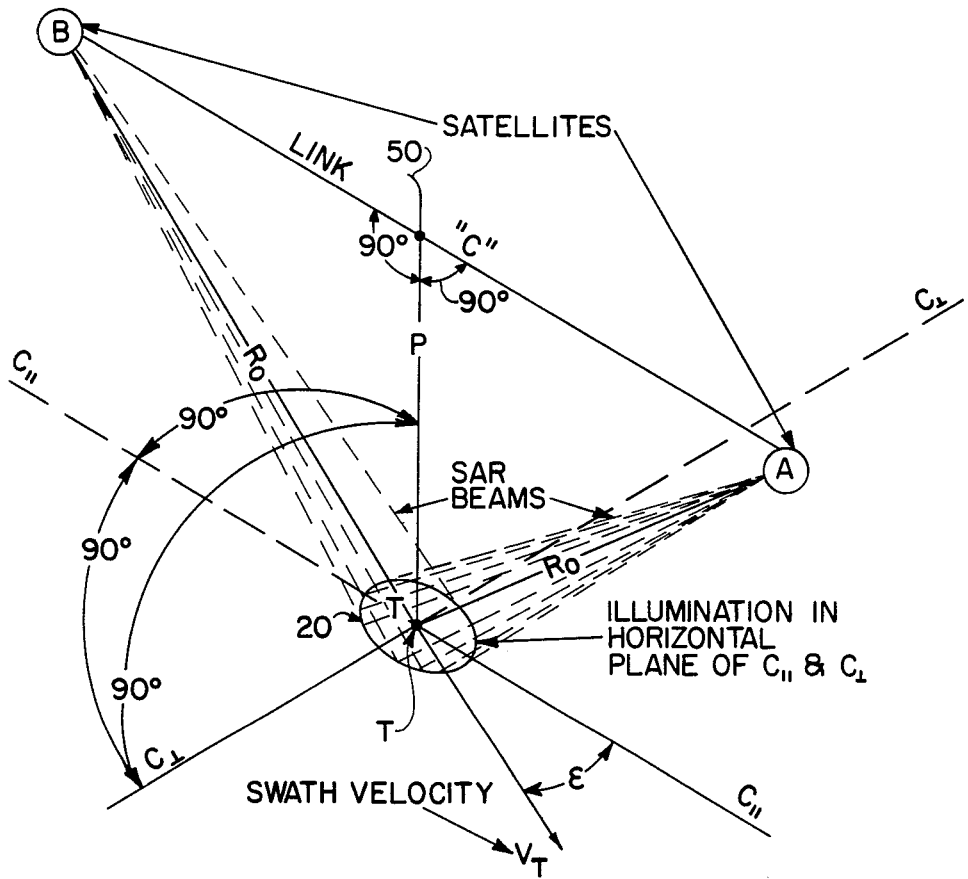
FIG. 4 is a perspective view of the preferred method of satellite operation of the present invention.

FIG. 4 is a perspective view of satellites A, B showing the geometry of communication link C, which is also the bistatic synthetic aperture radar base-line. Phase center line P intersects the origin or center of the signal envelopes, i.e., the point 50, which is also the bioptic center. This signal and optic origin 50 is the intersection of P with C. Surfaces of constant range and doppler (see FIGS. 6, 11, 12 and 13) are distributed symmetrically and concentrically about link C and centered on point 50. The signal surface of constant range is a prolate spheroid, wherein sections of the surface perpendicular to C are circles and sections parallel to C are ellipses, with focii at satellites A and B. Lines designated respectively, $C_{\parallel}$ and $C_{\perp}$ lie in the plane tangent to a hypothetically spherical earth at the point T and represent lines which are respectively parallel and perpendicular to communication link C. Therefore, since a line of constant range projects as an ellipse with major axis along C such a trace is shown about the point T in FIG. 4. The ideal recording plane is then parallel to C with its origin at the signal surface origin 50, but since it is not practical to illuminate this portion of space, the optimum practical orientation of a recording plane is that parallel with C but located preferably at a satellite or alternately at a ground station.

Figure 6:
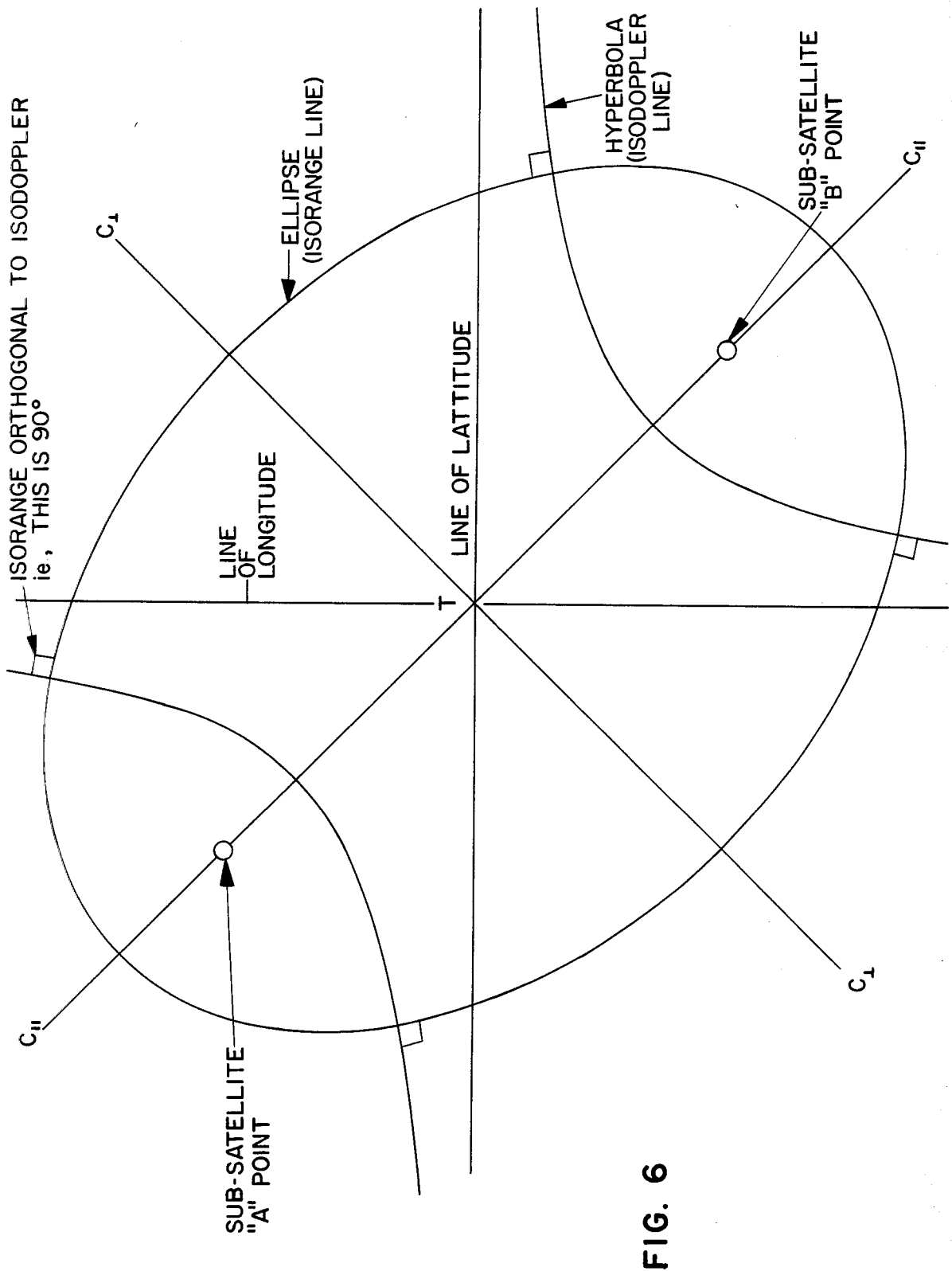
FIG. 6 is a schematic illustration of a portion of the surface of constant range and a portion of the surface of constant doppler observed in the method of satellite operation of the present invention.
Figure 12:
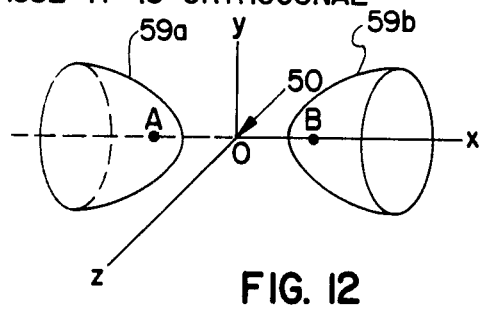
FIG. 12 is a schematic illustration of the hyperbolic surfaces of constant doppler for satellites A and B operating according to the method of the present invention; and, FIG. 13 is a plan view of the projection of the intersection isorange and isodoppler surfaces of FIGS. 11 and 12, respectively illustrating the orthogonality of the intersection of these surfaces.
Figure 13:
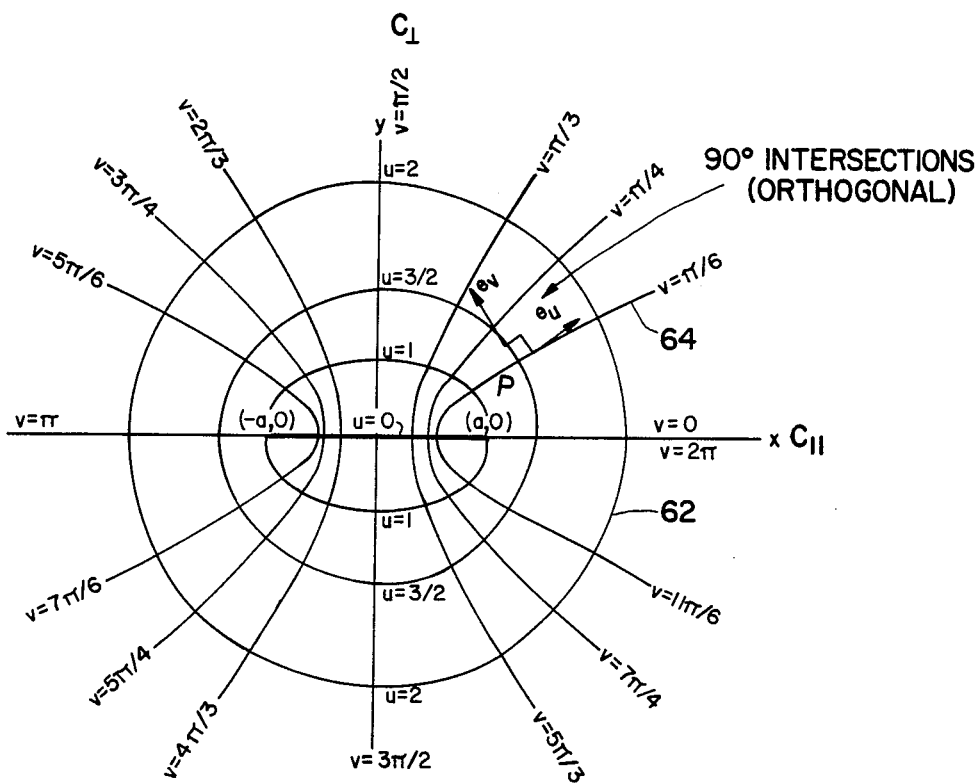

The signal surface of constant doppler is also important to the method of this invention. This surface is a hyperboloid of two sheets centered concentrically about C with focii at satellites A and B (FIGS. 6, 12, and 13). Although a line of constant doppler is not shown in FIG. 4 since the plane defined by the line $C_{\parallel}$ and $C_{\perp}$ is parallel to C, the plane intersects the hyperboloid sheets in a hyperbola with the same focii as the line of constant range. It can be shown that only planes parallel to C will have lines of constant range and doppler that would trace range and doppler as ellipses and hyperbolas with the same shared focii and would thereby be orthogonal. Since correlation of these signals for the reconstruction of imagery depends upon minimum cross coupling between range and doppler so that covarient terms will approach zero, the optimum recording plane is one which is parallel to C which thereby minimizes the reconstruction processing complexity and image aberrations.

Figure 5:
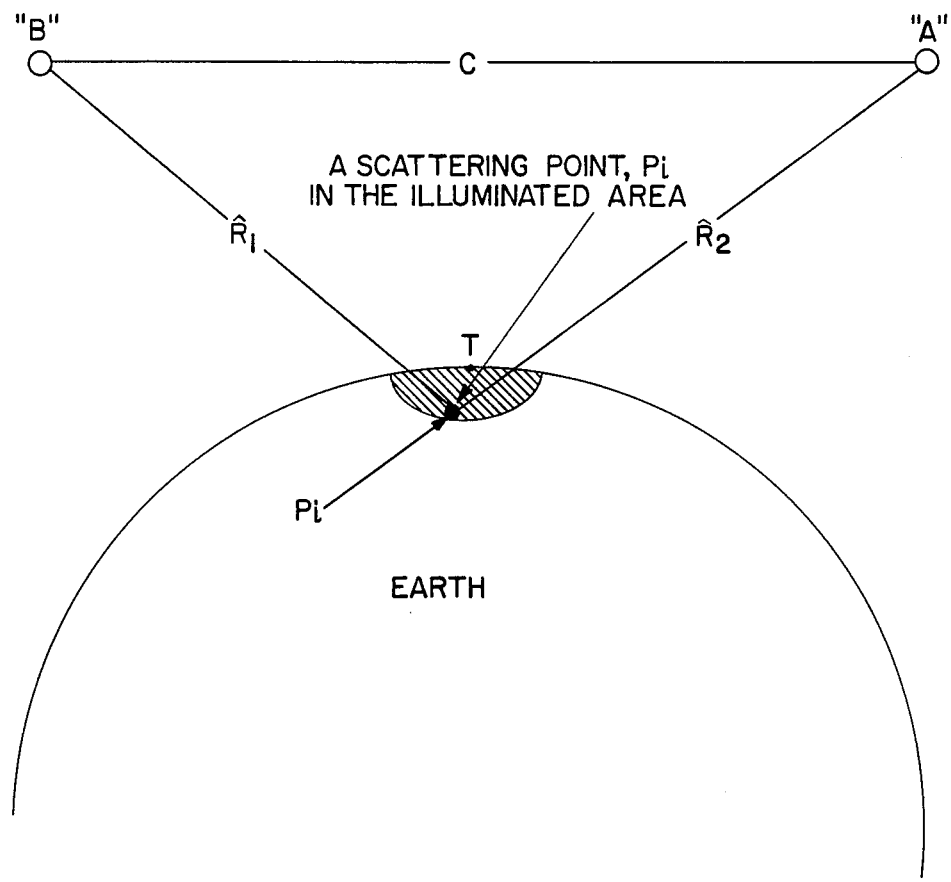
FIG. 5 is a schematic illustration of one method of satellite operation of the present invention wherein ranging vectors to a point object are resolved in the field of view.

Referring now to FIG. 5, the range to a point Pi located near the edge of the illuminated area 11 is illustrated. The bistatic range for Pi is the sum of R1 and R2, which is the same for all other points on the ellipse about the point T passing through the point Pi. It can be seen that this would lead to considerable ambiguity without appropriate measures to resolve the problem. In the method of the present invention, two additional methods are utilized to circumvent this ambiguity in range and doppler address with would otherwise result. These two methods are: (1) the orientation of link C rotates and changes length continuously throughout the aperture dwell time but with simple harmonic and consequently known apriori motion, and (2) the recording plane is tilted away from the plane defined by the line $C_{\parallel}$ and $C_{\perp}$ to effect a side looking recording and reconstruction configuration in the manner that is described in detail hereinafter. This second method is similar to the methods used in most other synthetic aperture radar methods which are generally side looking designs. In the case of the present invention, the side looking tilt is about the same as that used in other methods such as SEASAT and SIR-A, and is about 20° measured at the midpoint of the synthetic aperture dwell time.

FIG. 6 is a schematic illustration of the intercepts of the surfaces of constant range and doppler with the plane defined by the lines $C_{\parallel}$ and $C_{\perp}$. This figure shows an important advantage in the method of the present invention where it is seen that the intercept creates iso-range and iso-doppler lines which are orthogonal, which according to established principles enables deterministic signal sets and as minimizing cross coupling or zero covariance as well. When the halogram is reconstructed into an image, this orthogonality results in large savings in computer processing. It can be shown in accordance with the principles of calculus and analytical geometry that an ellipse and a hyperbola with a common focii intersect at orthogonal angles. It is therefore a result of utilization of the method of the present invention that base-line C is caused to move always in a plane parallel to the recording plane as described further hereinafter, which enables simpler imagery reconstruction than previous synthetic aperture radar. The method of the present invention also permits ideal determinism without introducing image aberrations from range curvature since the signal surface is nominally orthogonal everywhere in the recording plane. The iso-range and iso-doppler set illustrated in FIG. 6 is one of a family of iso-range and iso-doppler curves concentric about the point T which is the point of zero doppler and minimum range.

Figure 7:
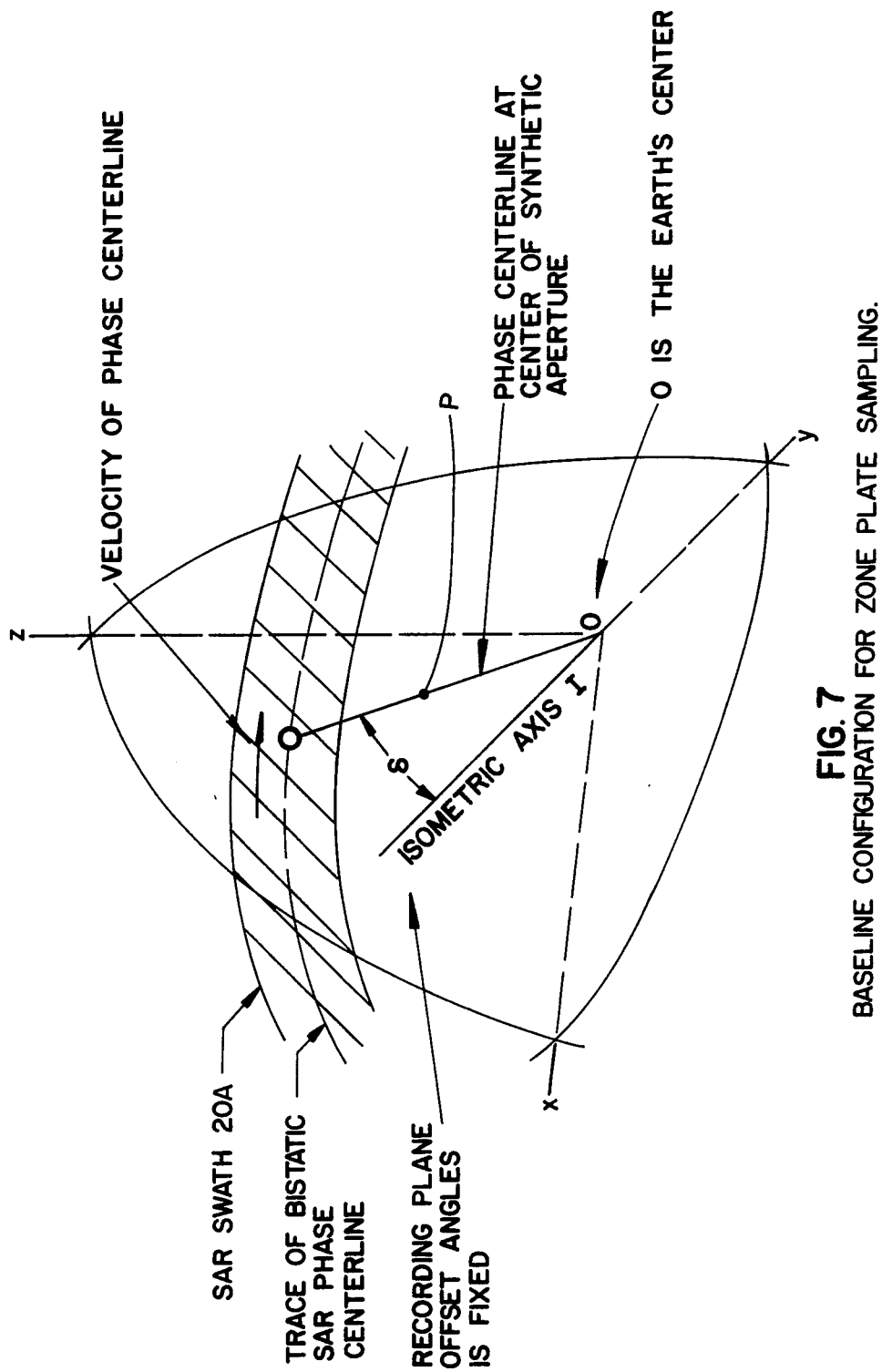
FIG. 7 is a perspective view of the synthetic aperture radar swath illustrating the orbital mechanics of the method of the present invention.

The center line of the synthetic aperture radar swath 20A is the trace of path of the phase center line P, as shown in FIG. 7. The swath width can be larger or smaller than that shown, and is a function of the satellite altitude, the radar beam width, and the angle of incidence. In the preferred method of the present invention, the radar is side looking at an angle $\delta$ (FIG. 7) which is shown in the figure at the time the swath passes a point of nearest approach to the center of a plane parallel to the recording plane. This point is on the great circle containing the orbital crossing and the center of the plane parallel to the recording plane (shown as "Ō" in FIG. 8). In the method of the present invention, the angle δ is equal to the arcsin (0.333) or about 20°. This side looking or zenithal angle δ (FIG. 7) is approximately the same as that used in other synthetic aperture radar satellite methods.

There are various techniques known in the art for skewing the radar beam to effect a side looking angle. The method of the present invention orients the plane of the synthetic aperture radar physical antenna in a plane parallel to the isometric plane which is parallel to the recording plane, while skewing the beam center line to intercept the point T, for example. The physical antenna can be, for example, a hybrid mechanical and phased array design using encapsulated phased array circuits matrixed in the antenna surface for beam steering as is known in the art. The skew angle of the radar beam is generally less than about 40°. In this method the mechanical pointing axis of the antenna is parallel to the isometric axis or vector (FIG. 7) which is equiangular from vectors X, Y, Z and which is oriented perpendicular to the plane of the paper in FIGS. 3 and 8, which places the antenna dynamics in a constant angular momentum state and the antenna surface in a plane parallel to the preferred recording plane.

In an alternative method, the mechanical pointing axis of the antenna intercepts the point T, thereby maintaining constant angular momentum while the individual receiving channels of the matrix phased array elements in the antenna surface are shifted in phase by synthesized phase control circuits in a manner as is known in the art to effect a rotation of the antenna phase center line equivalent to that of the above mentioned method. In either case, the pointing angle history is known to great precision due to the property of constant angular momentum of the antenna physical pointing axis, the baseline C, the phase centerline P, and $R_o$ in FIG. 4, and the isometric axis. In this fashion, the method of the present invention provides constant angular momentum to maintain the angle δ in FIG. 7 at a constant value, which is critical to the method of linear recording and reconstruction to be discussed hereinafter, and simultaneously is side looking which materially improves the ambiguity resolution of the present invention.

From satellite altitudes the earth surface field of view is rotating and is nearly spherical in shape. It is known to use polar formatted recording and image recontruction of range-doppler radar data for rotating spherical objects in a manner which is theoretically exactly linear, e.g., Walker's method. As Walker showed, there are two contraints to the practical use of this linear method: (1) the phase center line P of the range-doppler radar or synthetic aperture radar must intercept the center of the rotating object field, i.e., the earth's center in the case of the present invention; and (2) the angle δ must be maintained constant. In the present invention this is accomplished by the dynamics and geometry of the method as previously shown. Hence, the present invention meets all theoretical constraints for use of the linear polar formatted recording and imagery construction method, for rotating spherical object fields whereas no previous monostatic or bistatic synthetic aperture radar method has been able to do so. Using the method of the present invention, it is therefore possible to linearly record and reconstruct imagery over maximum field of view angles and synthetic apertues thus avoiding the problem known in the art as range walk and greatly simplify the required computer processing.

Figure 8:
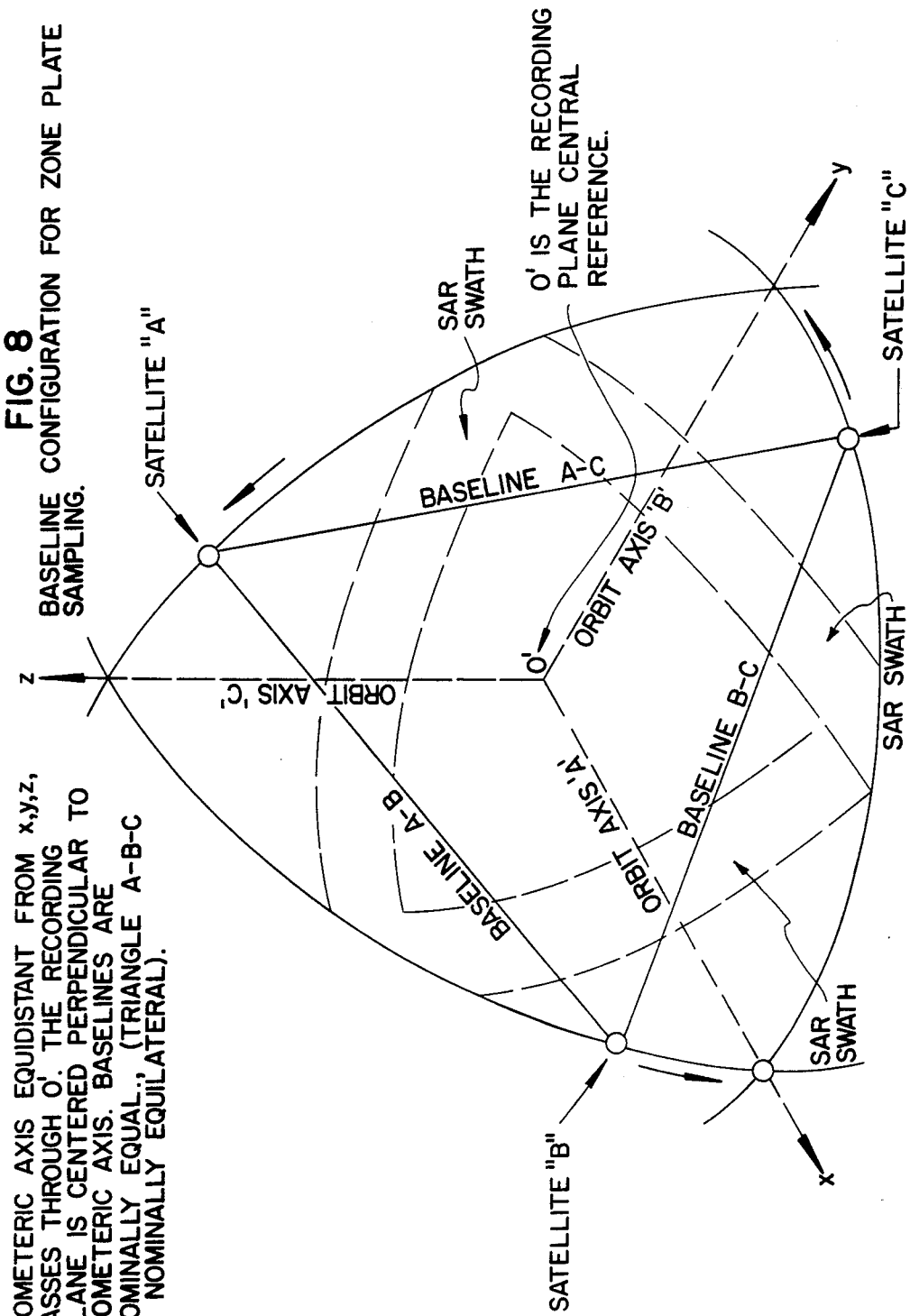
FIG. 8 is a isometric view showing three satellite to satellite base lines for a more fully populated embodiment of the method of satellite operation of the present invention which uses three satellites per recording plane.

FIG. 8 illustrates an alternative embodiment of the present invention in which three satellites, three bistatic synthetic aperture base lines, lines A-B, A-C, and B-C, and three synthetic aperture radar swaths are involved. In this more fully populated embodiment of the method of the present invention, the two-dimensional hologram of the zone plate of the image field is ideally sampled in the recording plane for reconstruction of the 3-dimensional imagery. In the method as illustrated in FIG. 8, all base lines are nominally equal, and satellite velocity magnitude as projected into the recorded plane are also nominally equal. This configuration minimizes the complexity of the 3-dimensional holography as well as as improving the processing and accuracy of the registration of the individual synthetic aperture radar holograms to the common reference doppler at point Ó. The significance of the improvement afforded by this method of uniform base line and velocity vector distribution in a zone plate is discussed hereinafter.

SYSTEM OPERATION

The several methods hereinafter described explain how the inter-related functional aspects of the system and method of the present invention are integrated to form a smoothly functioning satellite operation system.

MINIMIZING IMAGE DISTORTION

The shape of hypothetical signal surfaces 58 and 59 (FIGS. 11, 12) on which the range (surface 58), and the doppler (surface 59) can be unambiguously detected without aberration is critical to the practical detection of the synthetic aperture radar's range-doppler signals for imaging.

For the purposes of simplicity and clarity, these distortion free surfaces are described herein as if they were continuous, whereas in practice only that portion of the surface which is illuminated actually exists. Iso-range and iso-doppler lines 62, 64 are the projection of the family surfaces 58, 59, respectively onto the plane defined by the line $C_{||}$, $C_{\perp}$ (FIG. 13). The orthogonality of these lines is necessary to detection with minimum aberration or distortion.

A monostatic synthetic aperture radar signal recording and image reconstruction system can never be as distortion free as a bistatic synthetic aperture radar for the following reasons. From analytical geometry, it is well known that the locus of points perpendicular to a family of ellipses is a family of hyperbolas with each member of the family having the same focii. In the theory of bistatic radar, it is known that the signal surface of constant range, i.e., the iso-range surface, forms a prolate spheroid in space. This has a circular cross section perpendicular to the base line, and an elliptical cross section parallel to the base line, whereas the iso-range surface of a monostatic radar is a sphere. It is also known that the iso-doppler surface of a synthetic aperture radar has a hyperboloidal shape. A plane passed parallel to the base line of a bistatic synthetic aperture radar will intersect the surfaces as confocal ellipses and hyperbolas which are known to be orthogonal. A hypothetical example of this phenomenon is shown in FIGS. 6 and 13 where it is seen that the iso-range and iso-doppler lines always meet at right angles.

This orthogonal distribution of the signal surface results in optimal conditioning of the mathematical model used in synthetic aperture radar imagery construction, since covarience is nominally zero. Therefore, a simple second order mathematical model is hypothetically exact, i.e., there is no truncation error. The recording plane and the plane defined by the lines C$_{||}$ and C$_\perp$ are always parallel to the base line A-B or communications link C, as shown in FIGS. 4 and 6. These figures demonstrate that orthogonality of the signal surface occurs when the phase center line intersects the center of a hypothetical spherical earth. That is, the geometry of FIG. 4 creates the environment for the orthogonal signal surface of FIG. 6, which is dynamically stabilized in this preferred orientation by the dynamics of constant angular momentum attributed to the symmetry of the system as shown in FIGS. 3 and 8. This property of orthogonality is critical to optimum synthetic aperture radar reconstruction. Orthogonally is feasible in the bistatic synthetic aperture radar case, whereas it is not feasible in the monostatic synthetic aperture radar case where only two points in the image surface can be orthogonal and distortion is inevitable at all other points in the image. It is therefore feasible to avoid range curvature in the method of the present invention, whereas all prior conventional synthetic aperture radars were limited by this distortion effect.

A practical range-doppler video system depends upon the orthogonality of signals for its feasibility. As signal orthogonality degrades so does determinism and distortion increase. Therefore, the optimum synthetic aperture radar is a bistatic configuration wherein the phase center line passes through the earth's center and wherein the recording plane is parallel to the base line and perpendicular to the isometric axis since this is the orientation of minimum range walk and range curvature distortions. The method of the present invention thereby accommodates these desirable orientations and minimizes the most serious distortion effects, i.e., range walk, range curvature, etc. These distortion effects are seriously detrimental to conventional synthetic aperture radar, and limit the faithful reconstruction of images from holograms in a recording plane. The method of the present invention thereby improves over all prior monostatic and bistatic synthetic aperture radar methods.

In order to maintain signal orthogonality, the preferred embodiment of the present invention uses a recording plane which is always parallel to the bistatic synthetic aperture radar base line. In order to establish this necessary property and to maximize stable operation, the method of the preferred embodiment also fixes the base line and the recording plane inertially in space with constant angular momentum motion. The base line rotates with constant angular momentum about the isometric axis, which is equiangular with axes X, Y, Z, as shown in FIG. 3 and where the plane of the paper is an isometric plane, and is parallel to the recording plane, and the isometric axis is perpendicular to the isometric plane at its center. Base line C can be mathematically shown to be parallel to the recording plane in accordance with the following mathematical vector method:

Let C(t) be the instantaneous magnitude of the baseline and let Ċ(t) be the first derivative of C, and let $\rho_o$ be the satellite's central radius, then by vector math it can be shown that the angular momentum, $\hat{M}_c$ of vector Ċ is:

$$M_c = C \times \dot{C} = \rho_o^2 \omega_o \begin{pmatrix} -1X \\ -1Y \\ -1Z \end{pmatrix}$$

Then since the unit isometric vector or Î is:

$$I = \frac{1}{\sqrt{3}} \begin{pmatrix} -1X \\ -1Y \\ -1Z \end{pmatrix}$$

It is clear $\hat{M}_c$ is parallel to Î. Then by classical mechanics the invariant plane of motion of C(t) is in the plane perpendicular to $\hat{M}_c$, i.e., C(t) lies always in the isometric plane, which is parallel to the recording plane.

The communication of synthetic aperture radar phase information is feasible over an all space communication link since there is no atmospheric scintillation to cause phase uncertainties. It is therefore feasible to delay recording the video in a bistatic synthetic aperture radar if it is advantageous to do so until it returns via the communication link along the base line back to the transmitting satellite. Alternatively, the video signal may be recorded at the receiving satellite. It is not practical to delay recording the information until a ground station has received it since phase coherence can not be maintained accurately through the atmospheric transit from satellite to the ground due to excessive phase scintillation effects and refraction uncertainty in the atmosphere.

In summary, since the method of the present invention permits the recording plane to be maintained parallel to the synthetic radar aperture base line for optimum detection and imagery reconstruction at satellites A, B, then the orbital mechanics method of arraying all satellites in the manner shown in FIGS. 3 and 8, such that the base line (A-B in FIG. 8 and C in FIG. 3) rotates with constant angular momentum perpendicular to the isometric axis I (perpendicular to the plane of the paper in FIGS. 3 and 8) is a significant improvement over previous synthetic aperture radar methods which reduces distortion. Furthermore, since mechanical perturbations lead to phase noise in the record which degrades image contrast and resolution, and since these mechanical perturbations are minimized by the method of the present invention which maintains constant angular momentum, this method leads to optimum image quality. The orbital orientation illustration in FIG. 3 is also suitable for use with conventional inertially stabilized platforms for supporting antenna or recording devices aboard satellites wherein the platform for the antenna and/or recording device is maintained with constant angular momentum rather than the entire satellite. Hence, the orbital method illustrated in FIG. 3 may be used either with conventional inertially stabilized platforms located aboard satellites or with inertially stabilized antennae as described above. Either method would provide the preferred environment for the antennae and recording devices in distortion free orientation.

In order to minimize projection distortion at the edge of the recording plane, it is optimum to have the center of the recording plane tangent to the earth's surface, or parallel thereto, at the center of the recording plane (at O in FIG. 8). This is also the method of the preferred embodiment of the present invention when more than two satellites are used to sample the zone plate for reconstruction for 3-dimensional holography as described in greater detail below (see FIG. 8). In mapping each synthetic aperture radar's one dimensional holograms in the common recording plane, the geometry of each synthetic aperture radar swath is side looking in the recording plane, i.e., each synthetic aperture radar swath is inclined relative to the recording plane so that it has a zenithal angle of about 20° off vertical.

The side looking geometry of the recording plane-to-zenith angle creates an iso-range and iso-doppler history line distribution in the recording plane which is unambiguous in a manner analogous to that used by more conventional synthetic aperture radars. The preferred method of the present invention eliminates ambiguity in the range-doppler recording since the location of each cell and its boundary slope are unique for all targets imaged by the method. This method comprises two steps: (1) the synthetic aperture radar swath plane is side looking or inclined to the recording plane, hence cells with the same range-doppler address will have different projected size and coordinates, and (2) the base line length and azimuth cycles in a simple, repetitive and known manner which rotates the iso-range/iso-doppler line slope and cell boundary and varies the holographic fringe intervals cyclically in time. This cyclic motion of the base line and the recording plane was analyzed in detail in the original disclosure document SARAH, dated April 1980, the contents of which are incorporated herein. The cycle period is one-half the orbital period and since the maximum feasible synthetic aperture dwell time is about one-quarter of the orbital period, each resolved cell's orientation, position and fringe interval will not repeat in this maximum dwell time and is therefore unique and unambiguous. In this fashion, the resolved cells can be uniquely identified for each pulse, for each look time, for each aperture dwell time, etc. and the recording format is unambiguous at all times.

FIG. 8 shows one of a potential eight mapping plates which would comprise a global conformal real time mapping and imaging system. It is seen that each satellite links with two other satellites in FIG. 8. In a fully populated configuration, each satellite also links with two other satellites in three adjacent conformal mapping planes (not shown in FIG. 8). Then in a fully populated configuration, four synthetic aperture antennae per satellite can be used to generate a maximum of twenty four swaths globally in real time (three swaths per zone plate × eight plates = twenty four). Since each satellite serves two plates, twelve satellites are needed to service a fully populated case. When this level is reached the orbital configuration will be as in U.S. Pat. No. 3,243,706. In each case the attributes of imagery orthogonality, imagery linearity, and system stability (constant angular momentum components, and stable equilibrium orbits, etc.) will be enabled by the method of this invention, but calibratability is improved in the fully populated case.

MAXIMIZING STABILITY FOR OPTIMUM IMAGE QUALITY

The preferred embodiment of the present invention uses satellites in 5:1 resonant orbits as well as specifying stable equilibrium orbital epochs. With monostatic synthetic aperture radar, phase jitter limits the information content of the total imaging system. In monostatic synthetic aperture radar, the primary source of jitter is the uncertainty in antenna pointing, since the beam center and phase center line are one and the same. In the case of bistatic synthetic aperture radar, the uncertainty in the phase center line depends upon the uncertainty in the satellite-to-satellite line of sight C or base line A-B. In bistatic synthetic aperture radar, if the base line A-B has constant angular momentum, it is possible to have a phase center line with constant angular momentum also. In the preferred embodiment of the present invention, the phase center line P (FIG. 4) has constant angular momentum, and is thereby optimally stable. Due to the great separation distance between satellites, the base line A-B and the phase center line P of the present invention are many orders of magnitude more stable than is possible with monostatic synthetic aperture radar or aircraft supported bistatic synthetic radar. The method of the present invention therefore leads to maximum information content, i.e., maximum contrast with finer resolution.

PROVIDING THREE DIMENSIONAL HOLOGRAPHY

All previous synthetic aperture radar generated one dimensional holograms which were the basis for reconstructing 2-dimensional imagery. The method of the present invention also use one dimensional holograms to sample a 2-dimensional hologram or zone plate. This zone plate, however, becomes the basis for reconstruction of 3-dimensional holography. Hence, the present invention produces 3-dimensional holography in addition to 2-dimensional bistatic synthetic aperture radar imagery. The mechanical, dynamic, and geometric configuration of the method of the present invention is the principal method used to accommodate and simplify the recording requirements of 3-dimensional holography.

In the preferred embodiment of the present invention, two or three bistatic synthetic aperture radar swaths per recording plane are oriented symmetrically about the plane center Ó (FIG. 8) in order to uniformly sample and map out a 2-dimensional hologram or zone plate of the object field, i.e., a portion of the earth's rotating surface. This method records and processes the diffraction patterns in the zone plate faithfully, efficiently and simply. The preferred method of the present invention uses a unique orbital array, synthetic aperture radar swath, and recording plane configuration which groups the doppler dynamics in order to simplify the recording and data processing required. The description below will explain how in the method of the present invention the swath velocity and doppler are grouped to form a synchronized signal set and which then coherently overlays the sampling synthetic aperture radar holograms, which leads to maximum information capacity in the final imagery. This symmetrical method (see FIGS. 3, 8) reduces synthetic aperture radar processing complexity. Another method of the present invention uses the path paralleling link C for a reference radar beam, i.e., an additional SAR beam of the same frequency and phase when transmitted. This reference beam will interfere with the reflected radar signal returning to the receiving antenna from the object field. In this case, the interference fringe occurs at the SAR receiving antenna, where it is detected.

ZONE PLATE REGISTRATION, CALIBRATION, AND OPTIMUM SAMPLING

Optimum sampling of the diffraction pattern of the zone plate is accomplished efficiently in the method of the present invention. This is achieved by a triangular distribution of synthetic aperture radar base lines, as is shown in FIG. 8. These base lines are all nominally equal, and rotate clockwise or alternatively counter clockwise while expanding and contracting in a known and simple harmonic cycle. This precisely repetitive dynamic state simplifies processing by enabling simpler doppler tracking dynamic models in the processor.

The method of a triangular synthetic aperture radar distribution has the area necessary to sample and map out the large area of the 2-dimensional zone plate. The variable base line length selectively samples the spatial frequency of the diffraction pattern in the zone plate. With this triangular base line configuration, conventional triangulation and closure methods, i.e., as commonly employed in surveying for the consistency control of data, are feasible. Nominally, the synthetic aperture radar swath base lines A-B, B-C and A-C in FIG. 8 comprise an equilateral triangle. Since the baselines are equal, the interference fringe spacing in the one dimensional hologram of a hypothetical point target at the origin, i.e., the center of the triangle A-B-C, will be identical in each of the one dimensional holograms of this central point target in each of the three separate synthetic aperture radar one dimensional holograms. In this fashion, phase errors will be more readily detected and corrected by comparing fringe intervals and offsets for consistency. Hence, the mapping plane will be registered more accurately with simple scaling and shifting mathematical methods. The center of this mapping triangle is the preferred imagery reference point since it is also the intercept of the zero doppler lines for each synthetic aperture radar swath. The method of the present invention, therefore, provides for both efficient sampling, i.e., maximum resolution and contrast, as well as cartographically accurate imagery. The fringe interval will be identical for pixels located in the center or origin of the zone plate. This simplifies the registration of the individual one dimensional holograms to the 2-dimensional format of the zone plate at the origin, since the hologram of a point target at the origin map identically in phasing of the fringes and in fringe interval for all synthetic aperture radar swaths that overlap the origin. Hence, synthetic aperture radar phase offsets can be corrected with a simple stratagem: (1) using conventional mathematical shifting methods, center the one dimensional hologram about the origin, and (2) using conventional mathematical scaling methods adjust the central fringes to the same interval while adjusting the rest of the synthetic aperture radar record accordingly.

OPTIMIZING ELECTRONIC DATA PROCESSING REQUIREMENTS

In the acquisition and processing of range-doppler data to produce 3-dimensional holographic imagery, it is always best for a processor to maintain a processing pass band for the doppler component which is as close to the maximum doppler excursion as possible. This is true since a narrower pass band will excessively truncate the doppler data, leading to poor resolution, whereas a wider pass band will admit excessive noise, leading to poor contrast. For multiple channel systems with two or more range-doppler data streams, a synchronized phasing of matched filters for these range-doppler channels is preferred. In a symmetric distribution of synthetic aperture radar swaths, the synchronization of doppler signal excursion dynamics with a single tracking matched filter is feasible. It is then possible for the processor to track one or more range-doppler channels with optimum performance while simplifying the processor design. This in turn requires a symmetrical distribution of satellite and synthetic aperture radar swath velocity vectors in the recording plane. In this manner, only one system transfer function and one tracking pass band filter can be employed to optimally track all the synthetic aperture radar data. This simplifies the correlation of these separate synthetic aperture radar data streams. The method of the present invention uniformly distributes velocity vectors in the recording plane (see FIG. 8). The method of the present invention uses harmonically cycling, doppler sets comprised of the doppler from each sampling range-doppler data stream to improve doppler matched filter tracking. In order words, the orbital geometry and dynamics illustrated in FIG. 1 leads to the matched velocity set illustrated in FIG. 8, which in turn leads to optimum doppler tracking with minimal complexity, i.e., the ability to use only one tracking filter.

CONFORMAL MAPPING OF IMAGERY

Since the object field of the range-doppler imagery is nominally and preferably the earth's surface, the object field is rotating about an axis which is fixed in space by its constant angular momentum. As a rotating object field, the earth is symmetric in hemispheric pairs. A globally conformal mapping scheme, therefore, should be comprised of parallel pairs of mapping plates, and it should have an even number of planes. Since stability is critical to synthetic aperture radar processing, the orbits and synthetic aperture radar swath axes should have fixed stability in space, i.e., they should have constant angular momentum. With the spin axis of the object field and synthetic aperture radar swath axis both fixed, the inclination angle between the two axes will be fixed. A maximum north and south excursion of the synthetic aperture radar swath will be fixed and the maximum instantaneous doppler will generally repeat in fixed cycles. The doppler excursion repetition frequency will be twice the synthetic aperture radar swath rotational frequency, an even number again.

In the method of the present invention, to form a globally conformal system, a symmetric set of recording planes (or zone plates) is used. The projection angle history formed by the synthetic aperture radar phase center line and the recording planes repeat in fixed cycles. This cycle would repeat once per swath revolution if these were an odd number of recording planes used, and this cycle will repeat twice per revolution when even numbers of recording planes are used. In the method of the present invention, an even number of zone plates or recording planes are used in order to match the projected doppler cyles for all swaths. With an even plane distribution, a triangular distribution of synthetic aperture radar swaths centered on each zone plate may be used, and still obtain an exact cycle matching of the doppler band for each swath as projected in the plane. The method of the present invention thereby also provides for synchronous doppler pass band matching of each of the zone plates (up to a maximum of eight plates). This method simplifies processing, and is part of the method whereby it is feasible to add up to three synthetic aperture radar data streams per zone plate with only one system transfer function or matched doppler filter. This synchronized matched filter addition of multiple range-doppler channels is enabled uniquely in the method of the present invention.

In the method of the present invention, eight recording or zone plates, or mapping planes are used for imagery, since this number is the minimum number of parallel plates which provide realistic and manageable projection distortion.

MAXIMIZING HOLOGRAPHY INFORMATION

The preferred method of the present invention also uses resonant polar and equatorial orbits which maximize information contents of the changing scene's tautological sequences. It is known that the information content of sampled data is limited by the Nyquist criteria, which specifies that the maximum frequency of the sampled image can not be greater than about one-half the sampling frequency. A method which accommodates a higher sampling frequency therefore has superior information content. Since one dimensional holograms of the synthetic aperture radar swaths are used to sample zone plates, the swath repetition rate determines the information content. The reduced imagery has an optimum definition of the tautology of targeted specie signatures in the scene if the swath repetition rate is a maximum. This in turn depends upon the period it takes for the swaths to overlay between subsequent passes. This period is minimized when the orbital periods are multiples of the earth's spin rate. Such orbits are called resonant orbits. Hence, in the preferred embodiment of the present invention, resonant orbits are employed to improve the information content in the reduced 3-dimensional imagery.

Drifting orbits degrade the imagery and increase the holographic system complexity. The preferred embodiment of the present invention uses polar and equatorial orbits which have the most stable cross plane orbital parameters. Furthermore, the provision of satellites having resonant orbits which cycle five times to the earth's spin rate and orbit epochs in stable equilibrium maximizes the stability of the oribital elements within the orbital plane. The method of the present invention also contemplates the addition of satellites necessary to populate all eight imaging planes with triangulated base lines. When fully populated, the preferred embodiment of the present invention uses the satellite network pattern of the ROSAE concept disclosed in U.S. Pat. No. 3,243,706, the contents of which are incorporated herein by reference. In stable equilibrium, as specified in the method of the present invention, as an improvement over the ROSAE concept patent, the satellite errors are bounded to such small values that errors in doppler tracking pursuant to the preferred singular tracking filter method are negligible.

OPTIMIZING ORBITAL AND SYNTHETIC APERTURE RADAR SWATH STABILITY

There are eight planes which are isometric to the three orthogonal orbits used in the ROSAE satellite network concept as disclosed in U.S. Pat. No. 3,243,706. In the preferred method of the present invention, these eight isometric planes are used as the mapping set for the fully populated case. The five to one resonance and stable equilibrium orbital epochs for the fully populated cases also guarantees stable operation for the global imaging system. The stability of the method of the present invention exceeds that of all other satellite systems and therefor optimizes the information capacity of global holography in a reliable fashion.

OPTIMUM SUB-SURFACE IMAGING IN NON-REAL TIME

The method of the present invention which provides nearly perfect linearity over huge angular displacements of the synthetic aperture radar permits yet another method of operation not feasible with prior synthetic aperture radar systems. As is known, fine imagery is produced with only doppler data when the angular displacement becomes very large. Application of large angular displacement doppler imagery is not effected by badly degraded range resolution, and hence the method of the present invention permits operation in an enhanced doppler mode wherein range resolution is degraded. Since fine range resolution always requires wider radio frequency band with operation than does fine doppler resolution, the method of the present invention permits narrow band or doppler enhanced operation wherein the degraded range resolution has minimal effect and therefore permits low power operation which is critical to power limited satellite radar systems. Operation in the enhanced doppler or narrow band mode also enhances the signal to noise ratio. The narrow band method is used with a much wider synthetic aperture radar beam in view of this higher signal-to-noise advantage. In general, the narrow band mode of operation uses a wide synthetic aperture radar beam centered on the point T in FIG. 2. This mode of operation is conducive to non-real time imaging over very broad areas since the very large synthetic aperture has a very long dwell time, and mensurational geodesy methods are needed in post processing to remove biases from clock reference uncertainties due to oscillator variance and drift. This mode of operation is also optimized with longer wave length (lower frequency) synthetic aperture radar, which leads to wider beams consistent with adequate signal-to-noise ratios, and to much greater penetration of the earth by the synthetic aperture radar for sub-surface imaging. This mode of operation creates savings in power aboard satellites and yet does not sacrifice performance for stationary targets.

Since the synthetic aperture radar beamwidth can be greatly increased in the narrow band mode, the dwell time may be extended for very large orbital arcs to produce very fine ground resolution. Hence, the method of the present invention permits lower synthetic aperture radar frequencies, for example, in the UHF band to L band to be used without seriously compromising resolution. Hence, penetration of the earth for sub-surface imaging is greatly enhanced in the present invention over all previous synthetic aperture radars yet resolution is not seriously degraded. This mode of operation is characterized by lower frequency, larger antenna, wider beamwidth, and longer synthetic aperture dwell time. This mode of operation provides larger total information rates than all previous aperture radar, at an increased ratio ranging from ten to one to about ten thousand to one.

WIDE BAND RANGE-DOPPLER IMAGING

As with conventional range-doppler imaging radar, the present invention can accommodate a mode of operation where both range and doppler resolution are commensurate. In this wide band type of operation, the increased noise power from the wider band requires increased synthetic aperture radar antenna gain. Hence, the wide band mode of operation is characterized in the present invention by a spot light synthetic aperture radar beam shaping and pointing method to increase the gain. In the preferred method of the present invention, a synthetic aperture radar construction using phased array elements distributed throughout the antenna surface is used to form a hybrid mechanical and phased array antenna. The phased array pointing angles are generally constrained to a conical half angle about the mechanical center line about 40°. In this way, the advantages inherent in constant angular momentum motion of the synthetic aperture radar antenna are not sacrificed, yet ample spot light flexibility is feasible. The stability inherent in this dynamic condition leads to maximum antenna area consistent with tolerable phase uncertainties across the antenna surface. In the wide band mode, signal-to-noise limitations will require higher synthetic aperture radar frequencies than in the narrow band mode.

PRECISE AND SIMPLE ANTENNA DRIVE

The synthetic aperture radar antenna and the communications antenna for data transfer between satellites and baseline service to the bistatic synthetic aperture radar have constant angular momentum dynamics. Therefore, the drives are minimally complex and optimally precise and simple. The mechanics of this drive method were described in the disclosure titled SARAH dated April 1980, wherein it was shown that the system transfer function requirement is only first order, hence a conventional second order transfer function will result in zero error, i.e., the method provides a maximum tracking precision environment consistent with simple components.

Figure 9:
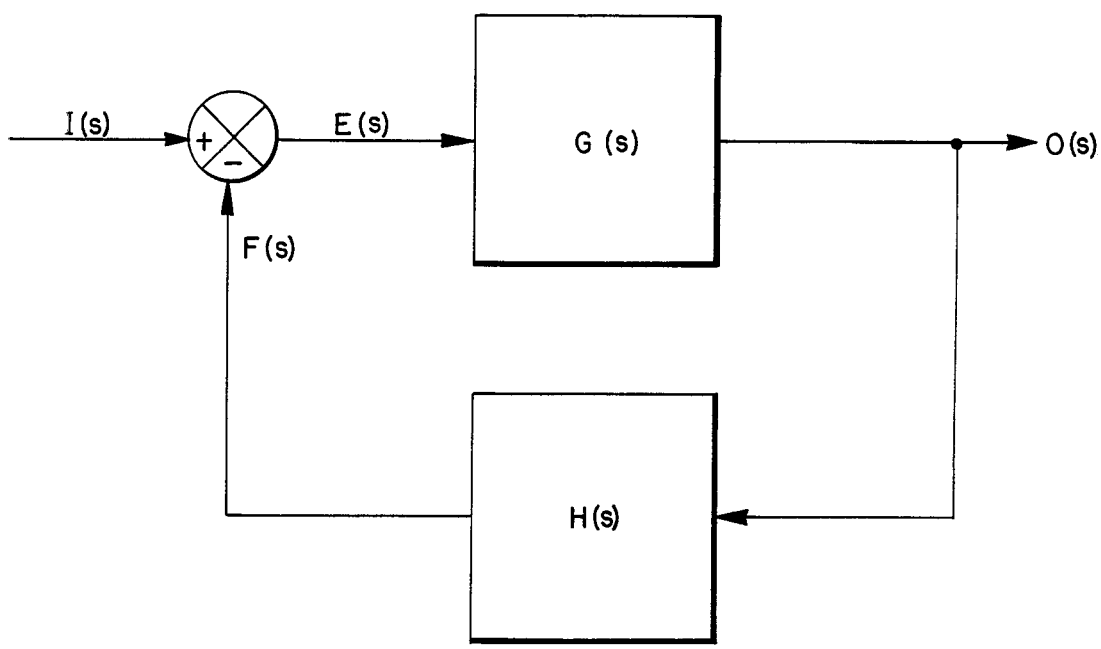
FIG. 9 is a frequency domain block diagram of a closed-loop servo-system which forms a portion of satellite operating system according to the present invention.
Figure 10:
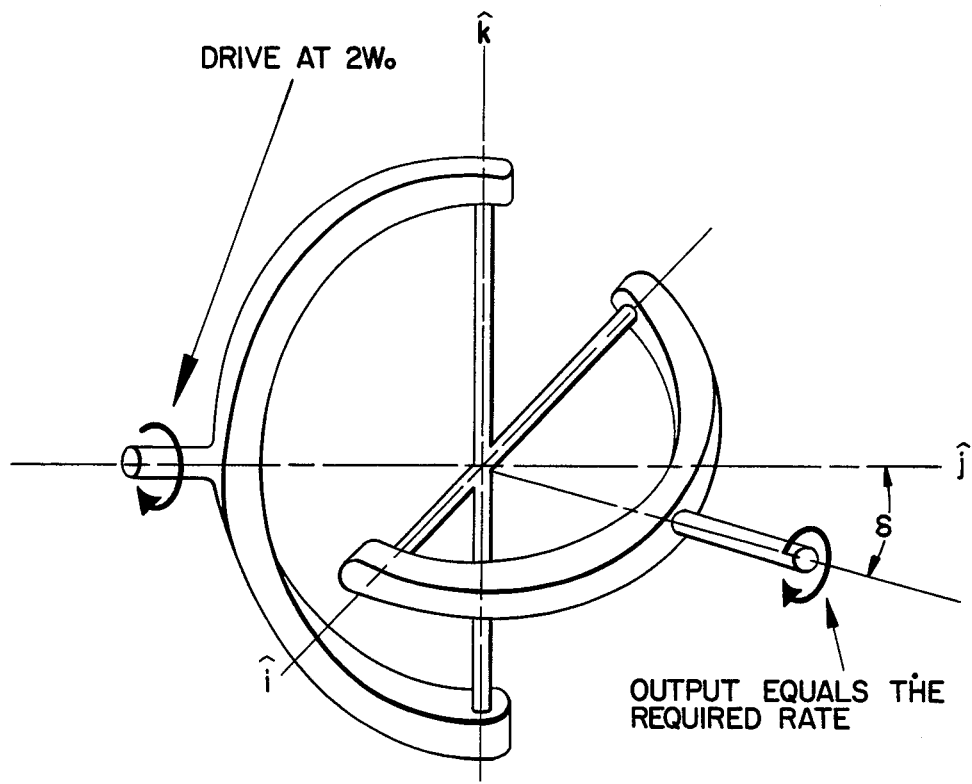
FIG. 10 is a schematic view of a universal joint which is an alternative embodiment for a portion of the method of the present invention.
Figure 11:
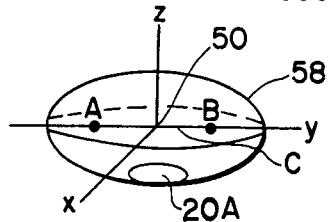
FIG. 11 is a schematic illustration of the prolate spheroid surface of constant range of satellites A and B operating according to the method of the present invention.

Two coupling methods are shown in FIGS. 9 and 10, respectively, wherein FIG. 9 is a frequency domain block diagram of a conventional electro-mechanical feedback servo control system and FIG. 10 is the mechanical equivalent. In the disclosure titled SARAH dated April 1980, the tracking requirement imposed by the coupling method illustrated in FIG. 10 was shown to be only a first order requirement. A constant speed input drive to a two degree of freedom coupling similar to the universal joint shown in FIG. 10 matches this tracking requirement. From conventional servo control theory, it is known that the error will be zero for this first order requirement if the system transfer function is second order for a simple feedback method as is shown in FIG. 9. The method of the present invention which permits such a simple antenna drive mechanism is an improvement over previous bistatic synthetic aperture radar systems e.g., U.S. Pat. No. 4,325,065 wherein the drive servo system was required to be third order for zero error operation.

The effects of station keeping operations aboard orbiting satellites in the case of single synthetic aperture radar base line systems results in unbalanced momentum which leads to cross coupling of angular momentum and satellite precession, i.e., wobble, which requires momentum shedding activity to be used to maintain the attitude of the satellite. In the method of the present invention, in more populated embodiments, satellite precession is reduced to zero since for two base lines per satellite plus two for a backup, the angular momentum sums along the satellite's pitch momentum vector thereby adding to the stability and reducing cross coupling to zero and eliminating the need for momentum shedding. This advantage minimizes the satellite's weight and power consumption for these otherwise non-functional devices, i.e., momentum shedding devices, reaction jets and tankage. The need for maximum stability and minimum position uncertainty for synthetic aperture radar antenna was explained above, but the intra-satellite communication link antenna have similar requirements. It is known that the capacity of the communication systems is related to the signal frequency and the link signal to noise ratio. For such point-to-point links, the antenna gain dominates these parameters and in the case of high gain links, pointing precision constrains the antenna gain. Hence, the communication system can be optimized if the dynamics of the communication beam have the property of constant angular momentum, which is a feature of the method of the present invention. It is further a feature of the method of the present invention to provide infinite acquisition time for the communications beams, since in the preferred 5:1 resonant orbit, the altitude of the satellites is such that the communication link is never obscured by the earth's limb. This aspect of the method of the present invention thereby removes constraints on the system's performance for optimum modulation methods, i.e., maximum time constants for phase-locked loops are feasible and hence optimum phase coherence is feasible. Both of these latter characteristics are significant improvements over previous synthetic aperture radar systems of operation.

The foregoing disclosure and description of the invention are illustrative and explanatory thereof and various changes in the size, shape and materials as well as in the details of the preferred embodiment may be made without departing from the spirit of the invention.

I claim:

1. A method for satellite based synthetic aperture radar imaging from at least two satellites, one of which is equipped with a synthetic aperture radar transmitter and another of which is equipped with a synthetic aperture radar receiver comprising:

establishing the satellites in nominally circular and orthogonal orbits, wherein the satellites orbit at equal angular velocity with respect to the earth, and wherein the polar crossing of the first satellite is coincidental with the equatorial crossing of the second satellite, the first and the second satellites thereafter traversing equal angle displacement with respect to the polar and equatorial axes respectively;

establishing an inter-satellite communications link for communicating data between the satellites, said data communication including coherent oscillator synchronization signals of the radar and of the communication system, and inter-satellite range and range rate data;

maintaining the physical center line of the transmission and reception radar antennae and communication antennae on the satellites tracking dynamically in a constant angular momentum mode;

illuminating an area of the earth with synthetic aperture radar transmission from one of the satellites;

receiving the reflected radar signal at the other of said satellites; and recording the received synthetic aperture radar in an isometric plane, said isometric plane being parallel to the plane perpendicular to one of the eight isometric vectors, said isometric vectors having an origin at the center of the earth and being equiangular with respect to the polar and equatorial axes of the earth in one of the eight quadrants defined by the polar and equatorial axes of the earth.

2. The method of claim 1 further comprising the steps of:

deriving the synthetic aperture radar radial doppler component due to the change in range from said first satellite to a point on the center of the illuminated area of the earth and then to said second satellite from data representing the inter-satellite range, the rate of change of the inter-satellite range, the altitude of said first satellite, and the altitude of said second satellite;

removing the derived synthetic aperture radial doppler component from the received synthetic aperture radar video signal before said video signal is recorded.

3. The method of claim 2 wherein the step of deriving the radial doppler component $\dot{R}_o$ is calculated according to the formula:

$$\dot{R}_o = \dot{C} \left[ \left( \frac{C^2}{2R_o^2} - \frac{C^4}{16R_o^2 \rho_o^2} \right)^{\frac{1}{2}} - \left( \frac{C^2}{4o^2} - \frac{C^4}{16R_o^2 \rho_o^2} \right)^{\frac{1}{2}} \right]$$

where $R_o$ is nominally the minimum radial distance from said satellites to the earth's surface, C is the range of the baseline between said satellites, $\dot{C}$ is the rate of change of range C, and $\rho o$ is the radial distance from said satellites to the earth's center.

4. The method of claim 1 wherein said satellite orbits are fixed as polar or equatorial.

5. The method of claim 1 wherein said satellite orbits are resonant in stable equilibrium.

6. The method of claim 5 wherein said orbits are resonant to the rotation of the earth in a 5:1 ratio.

7. The method of claim 1 wherein said synthetic aperture radar data is recorded in a polar format, and wherein the phase center line of the illuminating reflected beams is coincidental with the line which perpendicularly bisects the straight line connecting the first and the second satellite and intersects the earth's center; and, wherein the angle between the phase center line and the vector which is isometric to the polar and equatorial axes of the orbits in any given quadrant is constant.

8. The method of claim 2 wherein the altitude of the satellites is determined using a radar altimeter or other distance measuring device.

9. The method of claim 1 further comprising the steps of:

providing a reference radar beam at the same frequency as the synthetic aperture radar directed between the first satellite and the second satellite to mix and interfere with the received reflected synthetic aperture radar data to enable the construction of a three-dimensional hologram of the illuminated area.

10. The method of claim 1 further comprising the steps of:

providing a third satellite in an orbit which is nominally circular and mutually orthogonal to the orbits of the first and second satellites, the third satellite having an angular velocity and orbital epoch equal to that of the first and the second satellites;

generating at least two synthetic aperture radar images by the transmission, reception and recording of synthetic aperture radar signals between the three satellites; and sampling a two-dimensional hologram of a portion of the earth's surface with the two synthetic aperture radar images.

11. The method of claim 10 wherein said two-dimensional hologram is recorded in a plane parallel to said isometric plane.

12. The method of claim 11 wherein said two-dimensional hologram is subsequently coherently illuminated to produce three dimensional holography.

13. A method for satellite based synthetic aperture radar imaging from at least two satellites, one of which is equipped with a synthetic aperture radar transmitter and another of which is equipped with a synthetic aperture radar receiver comprising:

establishing said satellites in nominally circular and orthogonal orbits, wherein said satellites orbit at equal angular velocity with respect to the earth, and wherein the polar crossing of said first satellite is coincidental with the equatorial crossing of the second satellite, said first and said second satellites thereafter traversing equal angle displacement with respect to the polar and equatorial axes respectively;

establishing an inter-satellite communications link for communicating data between said first satellite and said second satellite, said data communication including coherent oscillator synchronization signals of inter-satellite range and range rate data;

illuminating an area of the earth with synthetic aperture radar transmission from one of said satellites and receiving the reflected radar signal at the other of said satellites;

maintaining the physical center line of the transmission and reception radar antennae and communication antennae on said first and said second satellite tracking dynamically in a nominally constant angular momentum mode; and, adjusting the phase of the received synthetic aperture radar data to simulate recording of the data in an isometric plane, said isometric plane being parallel to the plane perpendicular to one of the eight isometric vectors having an origin at the center of the earth and being equiangular with respect to the polar and equatorial axes of the earth in each of the eight quadrants defined by the polar and equatorial axes of the earth.

* * * * *

UNITED STATES PATENT AND TRADEMARK OFFICE
CERTIFICATE OF CORRECTION

PATENT NO. : 4,602,257

DATED : July 22, 1986

INVENTOR(S) : William H. Grisham

Page 1 of 2

It is certified that error appears in the above-identified patent and that said Letters Patent is hereby corrected as shown below:

At column 11, line 66 change "apertues" to --apertures--.

At column 13, line 14 change "Orthogonally" to --Orthogonality--.

At column 14, change first formula:

from:

$$M_c = C \times C = \rho_0^2 \omega_0 \begin{Bmatrix} -1X \\ -1Y \\ -1Z \end{Bmatrix}$$

to:

$$\hat{M}_c = \hat{C} \times \hat{C} = \rho_0^2 \omega_0 \begin{Bmatrix} -1 & \hat{X} \\ -1 & \hat{Y} \\ -1 & \hat{Z} \end{Bmatrix}$$

At column 14, change second formula:

from:

$$I = \frac{1}{\sqrt{3}} \begin{Bmatrix} -1X \\ -1Y \\ -1Z \end{Bmatrix}$$

to:

$$\hat{I} = \frac{1}{\sqrt{3}} \begin{Bmatrix} -1 & \hat{X} \\ -1 & \hat{Y} \\ -1 & \hat{Z} \end{Bmatrix}$$

UNITED STATES PATENT AND TRADEMARK OFFICE
CERTIFICATE OF CORRECTION

PATENT NO. : 4,602,257
DATED : July 22, 1986
INVENTOR(S) : William H. Grisham

It is certified that error appears in the above-identified patent and that said Letters Patent is hereby corrected as shown below:

At column 18, line 60 change "cyles" to --cycles--.

At column 23, line 32 change " $\rho_0$ " to -- $\rho_0$ --.

Signed and Sealed this

Twenty-seventh Day of January, 1987

Attest:

DONALD J. QUIGG

Attesting Officer    Commissioner of Patents and Trademarks